United States Patent Office 3,711,438
Patented Jan. 16, 1973

3,711,438
**METHOD OF MANUFACTURING THERMO-
PLASTIC RESIN MOLDINGS**
Rinnosuke Susuki, Tokyo, Hiroshi Hoshi, Narashino, Jiro Saito, Tokyo, Keiichi Murakami, Sendai, and Michio Hirakawa, Ichikawa, Japan, assignors to Lion Fat & Oil Co., Ltd., Tokyo, Japan
No Drawing. Filed Apr. 19, 1971, Ser. No. 135,496
Claims priority, application Japan, Apr. 25, 1970, 45/35,746; Apr. 27, 1970, 45/35,416
Int. Cl. C08f 45/04, 45/06
U.S. Cl. 260—41 R    2 Claims

ABSTRACT OF THE DISCLOSURE

A method of manufacturing thermoplastic resin moldings comprising the steps of: preparing a mixture consisting of thermoplastic resin, calcium sulfite and conventional inorganic filler; and molding said mixture.

BACKGROUND OF THE INVENTION

(a) Field of the invention

The present invention relates to an improved method of manufacturing thermoplastic resin moldings.

(b) Description of the prior art

When molding a thermoplastic resin, it is usual to add some filler thereto for the purpose of increasing the quantity of the resulting product as well as improving the properties thereof. Conventional fillers suitable for such use are mainly such inorganic fillers as, for instance, calcium carbonate, clay, diatomaceous earth, bentonite, aluminum oxide, asbestos, etc. However, employment of these fillers in said molding is accompanied by the defect that, when the composition prepared by adding the filler to the resin is blended by a Banbury mixer, the resulting mixture has a marked tendency to become abnormally colored and show a serious deterioration of sunlight resistivity thereof. This phenomena is considered mainly attributable to the generation of heat within the mixer due to the frictional resistance of the inorganic filler which results in said discoloration and deterioration of the resin mixture, and the solution of such a problem is beyond the powers of the cooling device provided for the mixer.

SUMMARY OF THE INVENTION

The present invention is intended to solve the foregoing knotty problem. It provides a method of manufacturing moldings from a mixture prepared by mixing a thermoplastic resin with a conventional inorganic filler, which is characterized by the fact that, in the process of mixing these components, calcium sulfite is also added to said resin simultaneously with or prior to adding the filler, in order to prevent the occurrence of coloring and to improve the sunlight resistivity of the resulting moldings.

DESCRIPTION OF THE PREFERRED EMBODIMENTS

Addition of calcium sulfite in the process of mixing said thermoplastic resin and inorganic filler serves to lower the frictional resistance of the materials within the mixer by virtue of the fluidity of said calcium sulfite, resulting in the prevention of undesirable coloring and deterioration of the compound due to the generation of heat. Therefore, the appropriate time for adding the calcium sulfite is simultaneously with or prior to addition of the inorganic filler: addition of the calcium sulfite after adding the inorganic filler will be fruitless.

As to the amount of calcium sulfite to be employed, any amount will do as long as it is more than 1% by weight based on the inorganic filler employed: in case it is less than 1%, the effect of calcium sulfite in preventing coloring and deterioration cannot be expected.

The method according to the present invention is applicable in molding any thermoplastic resin such as polyethylene, polypropylene, polyvinyl chloride, polyvinyl acetate, polystyrene as well as their copolymers and others, and the applicable means of molding includes such popular means as pressure molding, transfer molding, injection molding, low pressure molding, extrusion molding, blow molding and calendering. And, said conventional inorganic filler applicable in the present invention includes calcium carboate, clay, zinc oxide, calcium sulfate, titanium oxide, diatomaceous earth, aluminum oxide, etc. The conventional fillers can be employed either solely or by combining two or more of them.

Employment of a filler prepared by applying the compounding ratio of components as above has the advantage that, when it is added to a plastic and mixed therewith by a Banbury mixer, there takes place no coloring or deterioration of the plastic due to generation of heat. It seems that, by virtue of the good fluidity of calcium sulfite, the frictional resistance of the compound within the mixer is reduced and, as a result, coloring as well as deterioration of the plastic due to generation of heat is prevented.

EXAMPLE 1

Various resin compositions with compounding ratios as shown in the following table were blended by a Banbury mixer, and each of the respective mixtures was molded into a sheet by calender-roll processing. The result of visual test of the sheets thus obtained was as shown in the same table.

| Resin component | Wt. percent | Calcium carbonate (wt. percent) | Calcium sulfite (wt. percent) | Color tone | Sunlight resistivity [1] Before exposure | Sunlight resistivity [1] Post-exposure |
|---|---|---|---|---|---|---|
| Polyethylene | 30 | 65 | 5 | Milkwhite | 386 | 370 |
| Do | 65 | 30 | 5 | do | 625 | 618 |
| Do | 60 | 40 | | Dark gray | 586 | 364 |
| Ethylenevinyl acetate (90:10) copolymer | 30 | 65 | 5 | Milkwhite | 241 | 230 |
| Do | 65 | 30 | 5 | do | 481 | 458 |
| Do | 60 | 40 | | Dark gray | 428 | 218 |

[1] This is expressed by the tensile strength (kg./cm.$^2$) before and after 240 hr. exposure as measured by a Fade-O-Meter.

EXAMPLE 2

Various resin compositions with the compounding ratios as shown in the following table were blended by an inter-mixer, and each of the respective mixtures was cooled and pelletized and was subsequently molded into a plate, 5 cm. x 8 cm. x 2 mm. thick, by injection molding. The result of visual test of plates thus obtained was as shown in the same table.

| Resin component | (Wt. percent) | Clay (wt. percent) | Calcium sulfite (wt. percent) | Color tone |
|---|---|---|---|---|
| Polypropylene | 50 | 47 | 3 | Gray. |
| Do | 60 | 30 | 10 | Do. |
| Do | 60 | 40 | | Dark gray. |
| Ethylenepropylene copolymer. | 50 | 45 | 5 | Gray. |
| Do | 60 | 32 | 8 | Do. |
| Do | 60 | 40 | | Dark gray. |
| Polyvinyl chloride | 50 | 45 | 5 | Gray. |
| Do | 50 | 50 | | Dark gray. |

EXAMPLE 3

Various resin compositions with the compounding ratios as shown in the following table were blended by an open 2-roll mixer, and each of the respective mixtures was cooled and pelletized and was subsequently molded into a bottle having the capacity of 380 cc. and mean thickness of 0.8 mm. by blow molding. A suspension of barium sulfate (white-colored) was filled in this bottle, and thus the appearance of the bottle was examined. The result was as shown in the same table.

| Resin component | (Wt. percent) | Bentonite (wt. percent) | Calcium sulfite (wt. percent) | Color tone |
|---|---|---|---|---|
| Polyethylene | 60 | 35 | 5 | Gray. |
| Do | 60 | 40 | | Dark gray. |
| Do | 50 | 45 | 5 | Gray. |
| Do | 50 | 50 | | Dark gray. |
| Ethylenevinyl acetate (75:25) copolymer. | 55 | 43 | 2 | Gray. |
| Do | 55 | 45 | | Dark gray. |

What is claimed is:

1. A method of manufacturing molded products of thermoplastic resin, comprising the steps of: blending in a mechanical mixing and frictional heating device, (a) thermoplastic resin, (b) calcium sulfite and (c) inorganic filler selected from the group consisting of calcium carbonate, clay, zinc oxide, calcium sulfate, titanium dioxide, diatomaceous earth, aluminum oxide and mixtures thereof, to form a fluent moldable resin composition consisting essentially of a mixture of (a), (b), and (c), the amount of calcium sulfite incorporated in said composition being more than 1% by weight of the weight of said inorganic filler, said calcium sulfite being incorporated in the composition in said device prior to or at the same time as said organic filler is added to the composition in said device to reduce the frictional resistance of said composition during said mixing and frictional heating;

and molding the resulting mixture to form a molded product.

2. A molded thermoplastic resin which is obtained by a method according to claim 1.

References Cited

UNITED STATES PATENTS

| | | | |
|---|---|---|---|
| 2,530,852 | 11/1950 | Bixby | 260—34.2 |
| 3,112,290 | 11/1963 | Salyer | 260—45.5 |
| 3,075,940 | 1/1963 | Pazinski | 260—31.8 |
| 3,356,658 | 12/1967 | Anderson | 260—79.5 |
| 3,409,568 | 11/1968 | Holladay | 260—41 R |
| 2,865,779 | 12/1958 | Allen | 106—306 |
| 2,865,780 | 12/1958 | Allen | 106—306 |

MORRIS LIEBMAN, Primary Examiner

P. R. MICHL, Assistant Examiner

U.S. Cl. X.R.

260—41 A, 41 B

UNITED STATES PATENT OFFICE
CERTIFICATE OF CORRECTION

Patent No. 3,711,438          Dated January 16, 1973

Inventor(s) Rinnosuke Susuki et al

It is certified that error appears in the above-identified patent and that said Letters Patent are hereby corrected as shown below:

Col. 4, line 2; change "thermoplastic resin," to ---a member selected from the group consisting of polyethylene, polypropylene, ethylene-propylene copolymer, polyvinyl chloride and ethylene-vinyl acetate copolymer,---.

line 4; change ", zinc oxide, calcium sulfate, titanium dioxide, diatomaceous earth, aluminum oxide and mixtures thereof," to ---and bentonite---.

line 10; after "filler," insert ---and up to 10% of the total weight of the composition, the combined weight of said calcium sulfite and inorganic filler being in the range of 35% to 70% based on the total weight of the composition,---.

line 12; change "organic" to ---inorganic---.

line 17; change "which is" to ---product---.

Signed and sealed this 26th day of June 1973.

(SEAL)
Attest:

EDWARD M. FLETCHER, JR.　　　　　　　　ROBERT GOTTSCHALK
Attesting Officer　　　　　　　　　　　　Commissioner of Patentx